US011942715B2

(12) United States Patent
Tian et al.

(10) Patent No.: US 11,942,715 B2
(45) Date of Patent: Mar. 26, 2024

(54) TERMINAL POSITION ASSURANCE DEVICE AND CORRESPONDING CONNECTOR ASSEMBLY

(71) Applicant: Aptiv Technologies AG, Schaffhausen (CH)

(72) Inventors: Xiaoxian Tian, Shanghai (CN); Haifei Guan, Shanghai (CN); Weidong Zhang, Shanghai (CN)

(73) Assignee: Aptiv Technologies AG, Schaffhausen (CH)

( * ) Notice: Subject to any disclaimer, the term of this patent is extended or adjusted under 35 U.S.C. 154(b) by 23 days.

(21) Appl. No.: 17/732,699

(22) Filed: Apr. 29, 2022

(65) Prior Publication Data

US 2022/0393383 A1 Dec. 8, 2022

(30) Foreign Application Priority Data

Apr. 30, 2021 (CN) ......................... 202110485862.8

(51) Int. Cl.
*H01R 13/424* (2006.01)

(52) U.S. Cl.
CPC .................................. *H01R 13/424* (2013.01)

(58) Field of Classification Search
CPC .............................. H01R 13/424; H01R 4/305
USPC ........................................................ 439/752
See application file for complete search history.

(56) References Cited

U.S. PATENT DOCUMENTS 5,252,096 A * 10/1993 Okada ................ H01R 13/4362 439/752
5,299,958 A * 4/1994 Ohsumi ............. H01R 13/4362 439/752
5,464,353 A * 11/1995 Saijo .................. H01R 13/6272 439/489
5,478,262 A * 12/1995 Yamanashi ........ H01R 13/4362 439/752

(Continued)

FOREIGN PATENT DOCUMENTS

CN 107069257 A 8/2017
CN 110739573 A 1/2020

(Continued)

OTHER PUBLICATIONS

Extended European Search Report for application No. 22170854.8, dated Sep. 23, 2022, 11 pages.

(Continued)

*Primary Examiner* — Harshad C Patel
(74) *Attorney, Agent, or Firm* — Billion & Armitage

(57) ABSTRACT

A terminal position assurance device and a corresponding connector assembly are disclosed. The terminal position assurance device includes a main body having a main board, an upper board, and a lower board. The upper board and the lower board are arranged perpendicularly to the main board and are located on the same side of the main board. The upper board and the lower board have distal ends away from the main board. The terminal position assurance device further includes an extension arm extending from the distal end of the upper board in a direction substantially perpendicular to the main board and a stopper extending from an outer edge of the extension arm and thus going beyond the main body.

13 Claims, 7 Drawing Sheets

(56) References Cited

U.S. PATENT DOCUMENTS

| | | | | | |
|---|---|---|---|---|---|
| 5,507,666 | A * | 4/1996 | Yamanashi | H01R 13/641 | 439/354 |
| 5,797,772 | A * | 8/1998 | Sakurai | H01R 13/4362 | 439/752 |
| 5,839,923 | A * | 11/1998 | Yoshida | H01R 13/4361 | 439/752 |
| 6,010,374 | A * | 1/2000 | Miwa | H01R 13/4362 | 439/752 |
| 6,083,057 | A | 7/2000 | Annecke et al. | | |
| 6,152,783 | A * | 11/2000 | Tsuchiya | H01R 13/4361 | 439/752 |
| 6,171,150 | B1 * | 1/2001 | Saito | H01R 13/4361 | 439/352 |
| 6,200,172 | B1 * | 3/2001 | Konoya | H01R 13/4361 | 439/752 |
| 6,234,826 | B1 * | 5/2001 | Wilber | H01R 13/4368 | 439/352 |
| 6,322,391 | B1 * | 11/2001 | Kodama | H01R 13/4223 | 439/752 |
| 6,390,859 | B2 * | 5/2002 | Furutani | H01R 13/4362 | 439/752 |
| 6,648,699 | B1 * | 11/2003 | Makino | H01R 13/4362 | 439/752 |
| 6,655,999 | B2 * | 12/2003 | Mase | H01R 13/4223 | 439/752 |
| 6,702,626 | B2 * | 3/2004 | Ichio | H01R 13/4362 | 439/752 |
| 6,780,045 | B2 * | 8/2004 | Shuey | H01R 13/641 | 439/352 |
| 6,811,451 | B2 * | 11/2004 | Mase | H01R 13/4362 | 439/752 |
| 6,902,443 | B2 * | 6/2005 | Hara | H01R 13/4362 | 439/752 |
| 7,182,652 | B2 * | 2/2007 | Yamakado | H01R 13/4362 | 439/752 |
| 7,347,745 | B1 * | 3/2008 | Raudenbush | H01R 24/40 | 439/752 |
| 7,500,887 | B2 * | 3/2009 | Ichio | H01R 13/4362 | 439/752 |
| 7,544,081 | B2 * | 6/2009 | Lim | H01R 13/4361 | 439/352 |
| 8,016,606 | B1 * | 9/2011 | Kwan | H01R 13/641 | 439/352 |
| 8,096,841 | B2 * | 1/2012 | Hirano | H01R 13/4361 | 439/752 |
| 8,727,816 | B2 * | 5/2014 | Takahashi | H01R 13/4361 | 439/752 |
| 8,951,066 | B2 * | 2/2015 | Glick | H01R 13/426 | 439/752 |
| 9,160,095 | B2 * | 10/2015 | Littek | H01R 13/6272 | |
| 9,318,847 | B2 * | 4/2016 | Endo | H01R 13/639 | |
| 9,673,553 | B1 * | 6/2017 | Upson | H01R 13/426 | |
| 9,680,256 | B1 * | 6/2017 | Lane | H01R 13/6275 | |
| 10,038,278 | B2 * | 7/2018 | Lane | H01R 13/6272 | |
| 10,622,746 | B2 * | 4/2020 | Abraham | H01R 13/4362 | |
| 10,784,625 | B2 * | 9/2020 | Narama | H01R 13/641 | |
| 10,797,427 | B2 * | 10/2020 | Dupont | H01R 13/6271 | |
| 10,855,025 | B2 * | 12/2020 | Holub | H01R 13/641 | |
| 10,868,385 | B2 * | 12/2020 | Annequin | H01R 13/629 | |
| 11,189,951 | B2 * | 11/2021 | Endo | H01R 13/424 | |
| 11,217,938 | B2 * | 1/2022 | Narama | H01R 13/28 | |
| 11,296,460 | B2 * | 4/2022 | Kurita | H01R 13/641 | |
| 11,588,274 | B2 * | 2/2023 | Kirschner | H01R 13/639 | |
| 11,594,833 | B2 * | 2/2023 | Metzler | H01R 13/514 | |
| 11,594,938 | B2 * | 2/2023 | Syska | H02K 1/246 | |
| 2007/0093131 | A1 * | 4/2007 | Takahashi | H01R 13/4361 | 439/595 |
| 2019/0260149 | A1 | 8/2019 | Masada et al. | | |
| 2020/0112125 | A1 | 4/2020 | Liptak et al. | | |

FOREIGN PATENT DOCUMENTS

| | | | |
|---|---|---|---|
| CN | 113571940 | A | 10/2021 |
| DE | 102019119617 | A1 | 1/2020 |
| EP | 3203586 | A1 | 8/2017 |
| EP | 4084233 | A1 | 11/2022 |

OTHER PUBLICATIONS

CN Office Action for Application No. 202110485862.8; dated Feb. 28, 2023; 8 pages.

* cited by examiner

TERMINAL POSITION ASSURANCE DEVICE AND CORRESPONDING CONNECTOR ASSEMBLY

CROSS-REFERENCE TO RELATED APPLICATION

This application claims benefit of priority to Chinese Patent Application No. 202110485862.8 filed on Apr. 30, 2021, the entire disclosure of which is hereby incorporated by reference.

TECHNICAL FIELD OF THE INVENTION

The disclosure relates to a field of connector, and particularly to a terminal position assurance device and corresponding connector assembly.

BACKGROUND

In conventional design of a connector assembly, a terminal position assurance (TPA) device plays a role of locking the male terminal and enhancing a retention force of the male terminal in a male connector, preventing the male terminal from falling out under an external force to cause a wire power failure. The existing TPA device error-proof structure adopts a cantilever beam design. In such design, there is a problem of cantilever beam degradation due to the fact that the TPA device adopts a cantilever beam structure, resulting in a risk of function failure under repeated use. In addition, since the TPA device is floating, there is a problem of insufficient error-proof force or fracture.

SUMMARY

The present disclosure provides a terminal position assurance (TPA) device, and a connector assembly with this improved TPA.

One aspect of the present disclosure provides a terminal position assurance device, which may include a main board, an upper board and a lower board, wherein the upper board and the lower board are perpendicular to the main board and are located on the same side of the main board, and the upper board and the lower board have distal ends away from the main board, an extension arm extending from the distal end of the upper board in a direction substantially perpendicular to the main board, and a stopper extending from an outer edge of the extension arm and thus going beyond the main body.

Another aspect of the present disclosure provides a connector assembly, which may comprise: a first connector comprising a connector housing, the connector housing having a hollow portion in communication with openings at both ends, the hollow portion defining a passage for insertion of a mating connector; a terminal position assurance (TPA) device, the terminal position assurance device is to be mounted onto the connector housing and is to be switched between a pre-installed state and a fully installed state, the terminal position assurance device comprising: a main body including a main board, an upper board and a lower board, wherein the upper board and the lower board are perpendicular to the main board and are located on the same side of the main board, and the upper board and the lower board have distal ends away from the main board, an extension arm extending from the distal end of the upper board in a direction substantially perpendicular to the main board, and a stopper extending from an outer edge of the extension arm and thus going beyond the main body, wherein when the terminal position assurance device is in pre-installed state, the stopper of the terminal position assurance device is in the passage of the connector housing for entrance of the mating connector, and when the terminal position assurance device is in fully-installed state, the stopper of the terminal position assurance device is outside the passage of the connector housing for entrance of the mating connector.

BRIEF DESCRIPTION OF THE DRAWINGS

The present invention is now described, by way of example with reference to the accompanying drawings, in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

In the connector assembly of the present disclosure, the TPA device 3 is installed on a pre-installed position of a first connector 2. The first connector 2 is illustrated as a male connector for containing male terminal(s), but this invention is not limited to this. The on-site assembly of the connector is accomplished by first inserting a terminal (e.g., male terminal) into a first connector, pushing the TPA device to the end, and then inserting a mating connector into the first connector from the other side. TPA device 3 and the insulated housing of the first connector 3 may be made of plastic and adopts a rigid structure. The plastic housing of the first connector may adopt a design of through hole structure, and the corresponding TPA device is not required to be detached from the first connector.

Figure 1:
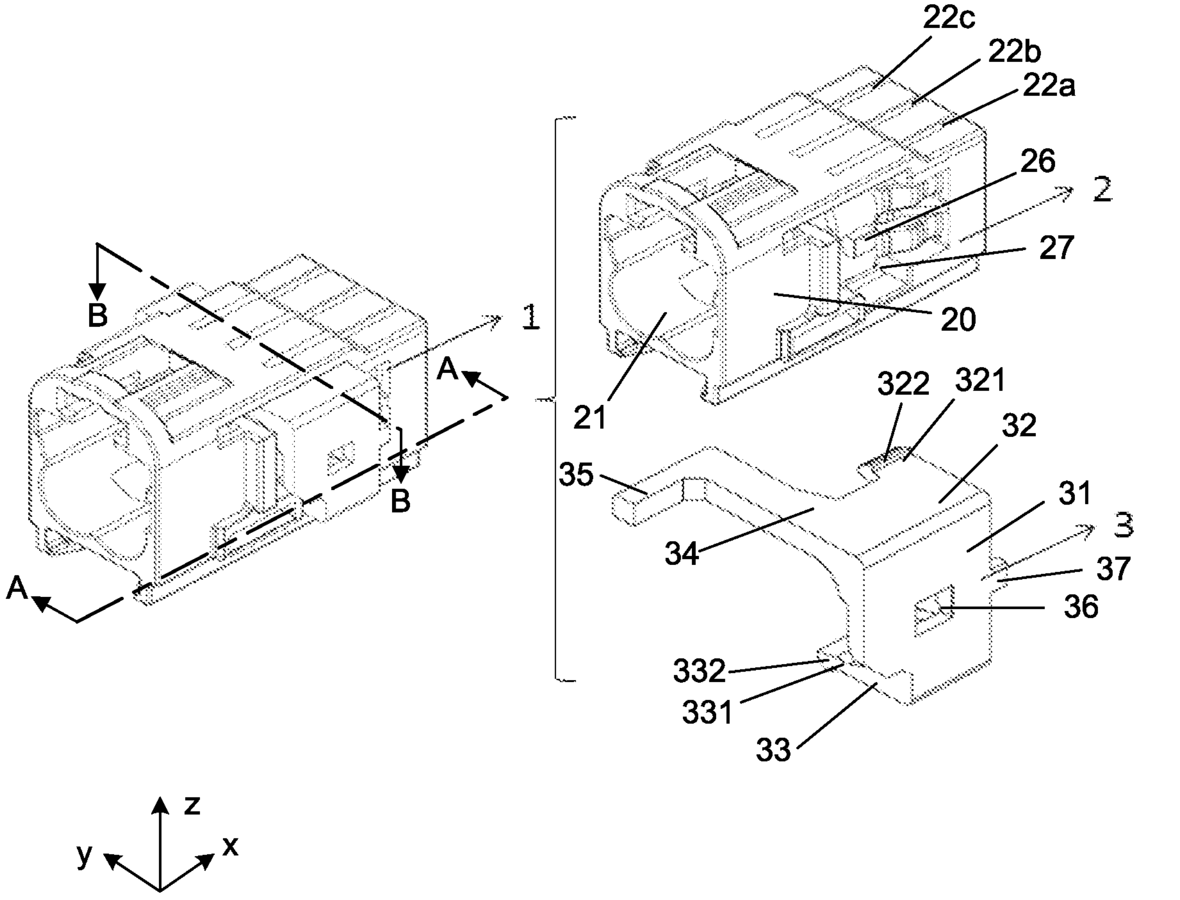
FIG. 1 is a schematic diagram illustrating an example connector assembly according to an embodiment
Figure 2A:
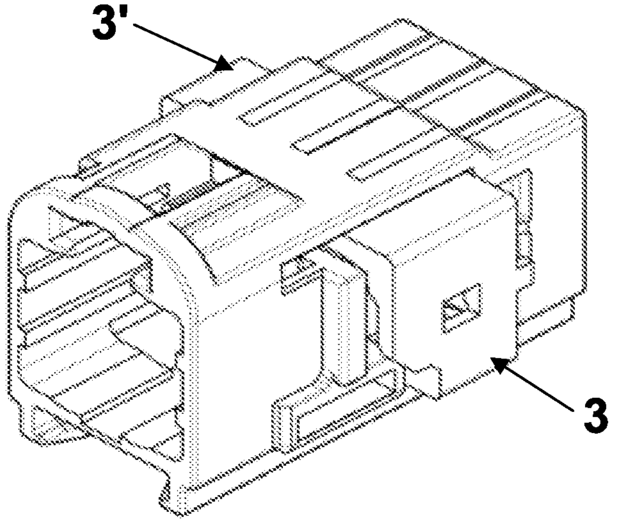
FIG. 2A illustrates a connector assembly with terminal position assurance (TPA) devices in a pre-installed state, and FIG. 2B illustrate the partial positions of TPA devices in this state.

FIG. 1 is a schematic diagram illustrating an example connector assembly 1 according to an embodiment. As shown in FIG. 1, the connector assembly 1 is assembled from a first connector 2 and a terminal position assurance (TPA) device 3. The TPA device 3 may be used to lock the terminal, and the number of TPA device 3 can be one or two. In the case of two TPA devices 3, as shown in FIG. 2A, these two TPA devices 3 can be mounted on both sides of the first connector 2 in a centrally symmetric manner with respect to the axis of the first connector 2. The TPA device 3 of the present disclosure is not required to adopt a flexible structure of a conventional TPA device in the form of cantilever beam, and the deformation generated during use is small, and the failure problem due to yielding can be avoided. The case of two TPA devices 3 is taken as an example to illustrate.

In the example shown in FIG. 1, the TPA device 3 is installed on the housing of the first connector 2 and is in a pre-installed position, and a product can be delivered in such state without detaching the TPA device 3 from the first connector 2. When in use, the on-site assembly of the connector can be accomplished by firstly inserting the terminal (not shown, e.g., male terminal) into a hollow portion 21 of the housing of the first connector 2 along the negative X-axis direction in the pre-installed state, pressing the two TPA devices 3 to the end (that is, pressing to the fully installed position from the pre-installed position), and then inserting the mating connector (not shown) into the hollow portion 21 of the first connector 2 along the positive X-axis direction from the other side. Upon assembly, the female terminal and male terminal in two connectors can form an effective electrical connection.

The TPA device 3 includes a main body composed of a main board 31, an upper board 32 and a lower board 33. The upper board 32 and the lower board 33 are substantially perpendicular to the main board 31 and are located on the same side of the main board 31 (in the figure, it is shown as the side in the positive Y-axis direction). The upper board 32 and the lower board 33 each extends in a direction away from the main board 31 and they have distal ends 321, 331 respectively.

The distal end 321 may be further provided with an upper engaging portion 322, and the distal end 331 may be provided with a lower engaging portion 332. The upper engaging portion 322 and the lower engaging portion 332 are elongated and protrude from the outer surfaces of the upper board 32 and the lower board 33 respectively, and their length direction is parallel to an extension direction of a boundary between the upper board 32 (lower board 33) and the main board 31, i.e., the X-axis direction.

The upper engaging portion 322 and the lower engaging portion 332 assist to stably maintain the TPA device 3 in a pre-installed position and a fully installed position. Specifically, the upper engaging portion 322 is engaged with a positioning groove 22*a* of the first connector 2 when the TPA device 3 is in the pre-installed position and is engaged with a positioning groove 22*b* of the first connector 2 when the TPA device 3 is in the fully installed position. The lower engaging portion 332 is similar to the upper engaging portion 322 and is engaged with the corresponding positioning groove (not shown in FIG. 1) at the lower portion of the first connector 2 when the TPA device 3 is in the pre-installed position and the fully installed position, respectively. Another TPA device (not shown) is also installed in the same manner where its upper engaging portion or lower engaging portion is engaged with the positioning groove 22*c* or the positioning groove 22*b* of the first connector 2 in the pre-installed position or the fully installed position, respectively.

In some embodiments, the TPA device 3 may have only one of the upper engaging portion 322 and the lower engaging portion 332. In this situation, part of the positioning grooves on the first connector 2 may be omitted to improve the strength of the first connector 2. For example, in the case of only one TPA device 3, only two positioning grooves may be provided on the corresponding upper or lower portions of the first connector 2 to define the pre-installed position and the fully installed position. In the case of two TPA devices 3, depending on whether the TPA device installed in a centrally symmetric manner on the other side has an upper engaging portion or a lower engaging portion, only two positioning grooves (the upper two positioning grooves and the lower two positioning grooves are arranged in a centrally symmetric manner) are provided on the upper and lower portions of the first connector 2 respectively, or three positioning grooves are arranged on only one side. It is certainly possible to provide three positioning grooves on the upper and lower portions respectively, as described in the present embodiment.

Figure 2B:
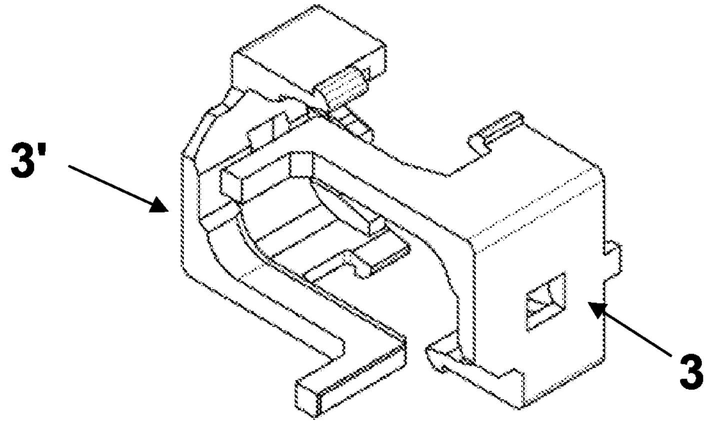
Figure 4A:
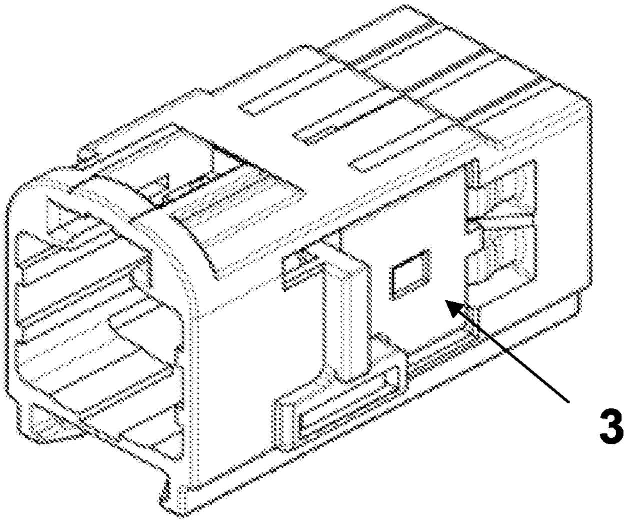
FIG. 4A illustrates a connector assembly with TPA devices in a fully installed state.
Figure 4B:
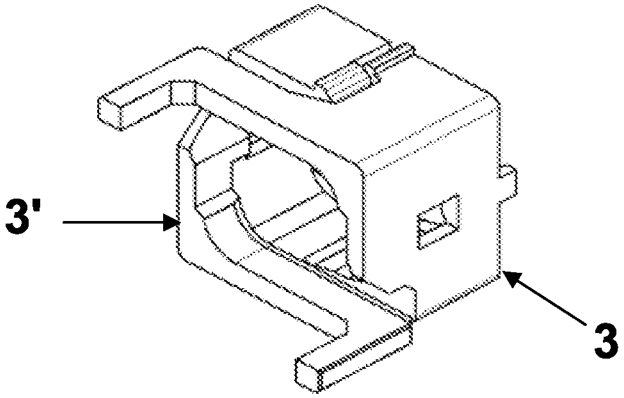
FIG. 4B illustrates the partial positions of TPA devices in this fully installed state.

As shown in FIGS. 1 2B and 4B, the TPA device 3 also includes an extension arm 34. The extension arm 34 further extends from the distal end of the upper board 32 in a direction (positive Y-axis direction) substantially perpendicular to the main board 31. In other words, the extension arm 34 is located on the same side of the main board 31 as the upper board 32 and the lower board 33.

As shown in FIG. 1, a stopper 35 extends from the outer edge of the extension arm 34 (the outer edge corresponds to the negative X-axis direction in FIG. 1) such that the stopper 35 goes beyond the main body. In some embodiments, the stopper 35 is located at the distal end of the extension arm 34. With reference to FIGS. 2A-2B and 3A-3B, the stopper 35 is used to block a passage in the hollow portion 21 of the housing of the first connector 2 (e.g., male connector) into which the mating connector (e.g., female connector) enters, so that the mating female connector cannot be pushed to the end to connect with electrical contacts within the first connector 2 when the TPA device 3 is in the pre-installed position. Referring to FIGS. 4A-4B and 5A-5B, when the TPA device 3 is in the fully installed position, the stopper 35 extends further into the hollow portion 21 and is positioned outside the passage in the hollow portion 21 into which the female connector enters, so that the mating female connector can further axially (i.e., in X-axis direction) enter into the hollow portion 21 to form an electrical connection with the electrical contacts within the male connector 2. In some embodiments, the stopper 35 extends in a direction substantially perpendicular to the extension arm 34 and parallel to the plane of the upper board 32.

The upper engaging portion 322 and the stopper 35 of the TPA device 3 are located on both sides of the main body of the TPA device 3 in the X-direction so as not to interfere with each other. Referring to FIG. 4B, the upper engaging portion 322 and the lower engaging portion 332 do not overlap with each other in the extension direction (i.e., X-direction) of the stopper 35, thereby allowing the upper engaging portion 322 and the lower engaging portion 332 of these two TPA devices 3 to engage with the middle positioning groove 22*b* of the three positioning grooves 22*a*, 22*b*, and 22*c* simultaneously when both of the TPA devices 3 are in the fully installed position. Otherwise, the upper engaging portion 322 (lower engaging portion 332) of the TPA device 3 in the fully installed position will cause interference with the lower engaging portion (upper engaging portion) of the corresponding TPA device that is installed in a centrally symmetric manner and also in the fully installed position. Further, since the stopper 35 extends to the side (the negative X-axis direction) beyond the main body, the stopper 35, the upper engaging portion 322 and the lower engaging portion 332 do not overlap with each other in the extension direction (i.e., X-axis direction) of the stopper 35.

In some embodiments, as shown in FIG. 1, the main board 31 of the TPA device 3 may further include a TPA device limiting portion 36 (the other side is not shown). The TPA device limiting portion 36 is used for mating with the housing limiting portion 26 on the housing of the first connector 2 (the other side is not shown) when the TPA device 3 is in the fully installed position, thereby limiting the movement of the TPA device 3 on the plane (X-Z plane) of the main board 31. Therefore, the position of the housing limiting portion 26 in the Y-axis direction should be set to enable at least partially mating with the limiting portion 36 when the TPA device 3 is pushed to the end (pushed to the fully installed position). In an exemplary embodiment, the TPA device limiting portion 36 may be a through hole or a recess, and the housing limiting portion 26 may be a bump. In another exemplary embodiment, the TPA device limiting portion 36 may be a bump, and the limiting portion 26 may be a through hole or a recess. When the TPA device 3 is in the pre-installed position, the housing limiting portion 26 and TPA device limiting portion 36 may be partially (pre)-mated or not be mated.

In some embodiments, the main board 31 may further include a detaching part 37.

The detaching part 37 may be a bump extending from the edge of the main board 31 to provide a force bearing point when detaching the TPA device 3 from the fully installed position. For example, the upper engaging portion 322 and the lower engaging portion 332 can be pushed out from the positioning grooves 22*a*, 22*b*, 22*c* to be released from the locked state by hand or a tool, and then the TPA device 3 can be pulled out to the pre-installed position by means of the detaching part 37.

The first connector 2 has a hollow connector housing 20. When the first connector 2 is a male connector, the connector housing 20 allows the mating female connector and the male terminal to insert from its both ends. Three positioning grooves 22*a*, 22*b*, 22*c* are provided in parallel on an inner side of the upper portion of the connector housing 20, and three corresponding positioning grooves are provided in parallel on an inner side of the lower portion. The positioning grooves 22*a*, 22*b*, 22*c* extend to the end edge along the insertion direction (positive X-axis direction) of the female connector. The positioning grooves 22*a*, 22*b*, and 22*c* are used for fixing the position of the TPA device 3 by mating with the upper engaging portion 322 and the lower engaging portion 332 described above. The positioning groove 22*b* in the middle is used to implement positioning of the fully installed position. The positioning grooves 22*a*, 22*c* on both sides are used to implement positioning of the pre-installed position. The positioning grooves 22*a*, 22*b*, 22*c* are provided on the inner side of the connector housing 20 so as to face the upper engaging portion 322 and the lower engaging portion 332. In some embodiments, the positioning grooves 22*a*, 22*b*, 22*c* may penetrate the upper portion or lower portion of the housing 20 where they are located to form slits, as shown in FIG. 1. Since only three positioning grooves are required, the main body between the positioning grooves has sufficient thickness, so that the positioning grooves can be designed to extend to the end edge without the concern about strength. As a result, the positioning grooves can be directly formed when the connector housing 20 is molded without adding additional sliders. On the contrary, if the number of positioning grooves is increased, the thickness of the main body portion between the positioning grooves will be narrowed. In order to ensure the strength of the connector housing 20, the positioning grooves have to be shortened as positioning holes, and additional sliders are required for molding in this situation. Therefore, the first connector 2 of the present embodiment can save the number of sliders during molding.

There are openings 27 communicating with the hollow portion 21 of the connector housing 20 on both sides of the housing 20, respectively. The opening 27 communicating with the hollow portion 21 enables the upper board 32, the lower board 33, the extension arm 34 and the stopper 35 of the TPA device 3 to enter into the hollow portion 21 through the opening 27. The opening 27 can also accommodate the main board 31 of the TPA device 3. The housing limiting portion 26 described above is provided in the opening 27. Such sharing design can save space, reduce the volume of the hollow portion 21, and ensure the strength of the connector housing 20.

Figure 3A:
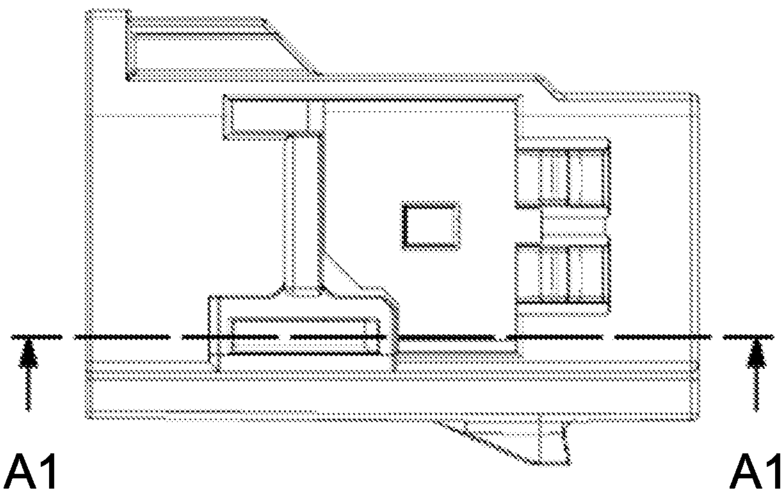
FIG. 3A and FIG. 3B illustrate cross-sectional views along line A-A of the connector assembly in the pre-installed state.
Figure 3B:
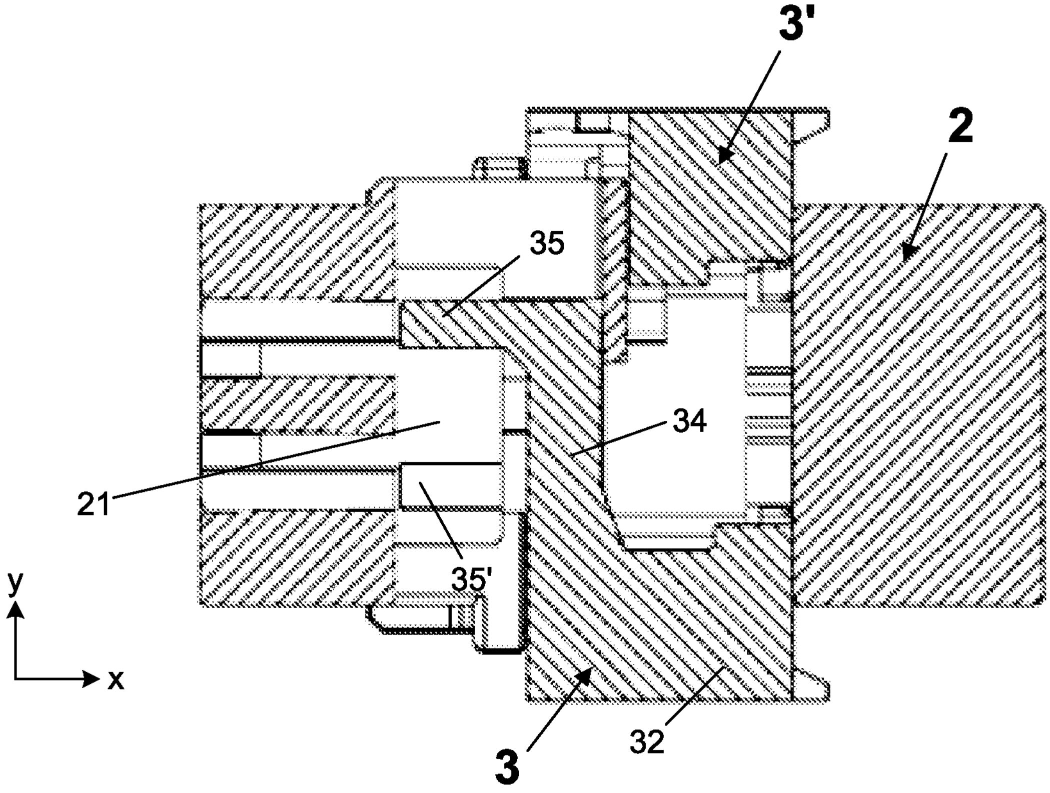
Figure 5A:
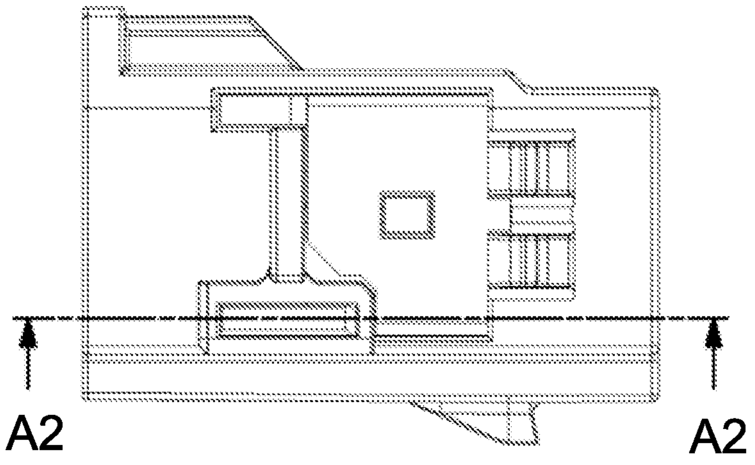
FIGS. 5A and 5B illustrate cross-sectional views along line A-A of the connector assembly in the fully installed state.
Figure 5B:
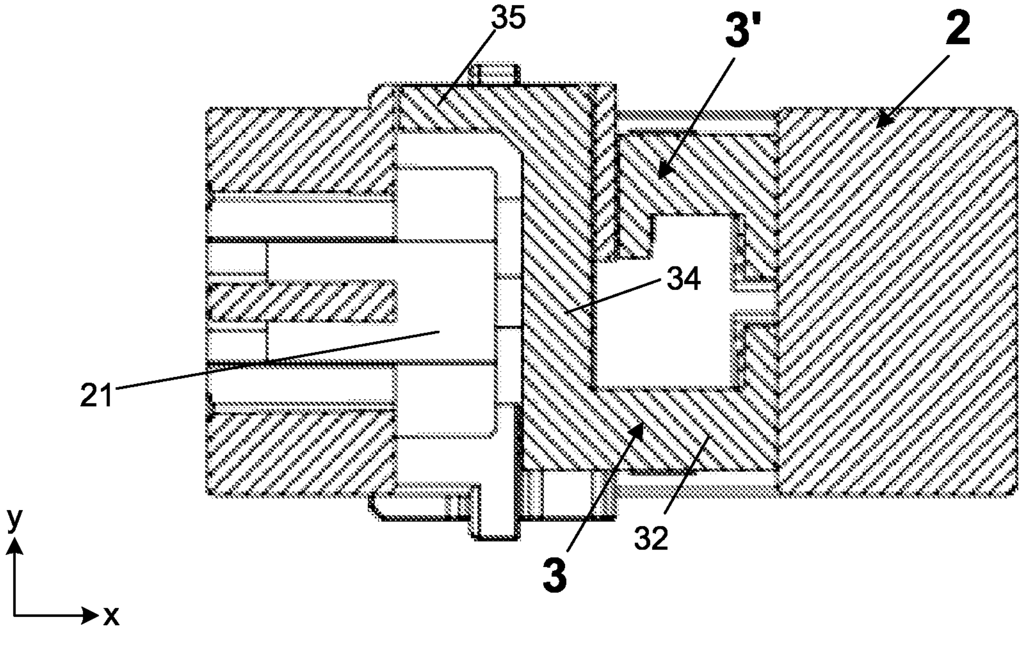

FIG. 3B and FIG. 5B are cross-sectional views along line A-A of the connector assembly 3 shown in FIG. 1, wherein FIG. 3B shows a pre-installed state, and FIG. 5B shows the fully installed state.

In the pre-installed state shown in FIG. 3B, TPA device 3 and TPA device 3' are not completely pushed into the first connector 2 in the lateral direction (Y-axis direction), while the extension arms 34 enter the hollow portion 21 through the openings 27 on both sides of the connector housing 20. At this time, the stoppers 35, 35' block the passage (in other words, they are within the passage) in the hollow portion 21 of the first connector 2 into which the mating connector enters. Therefore, the mating connector is blocked by the stoppers 35, 35' so that it cannot further extend into the hollow portion 21 to form an electrical connection.

If the TPA device 3 and TPA device 3' are further pressed inward such that the respective upper engaging portion 322 and the lower engaging portion 332 are respectively mated with the positioning groove 22*b* of the three positioning grooves 22*a*, 22*b*, 22*c* of the connector housing 20 that is located in the middle, the stoppers 35, 35' will extend further into the hollow portion 21 and are positioned out of the passage (in other words, they leave the passage) in the hollow portion 21 into which the mating connector enters, so that the mating connector can further axially (i.e., in X-axis direction) enters into the hollow portion 21 to form an electrical connection with the electrical contacts inside the first connector 2, as shown in FIGS. 2A and 2B.

Figure 6A:
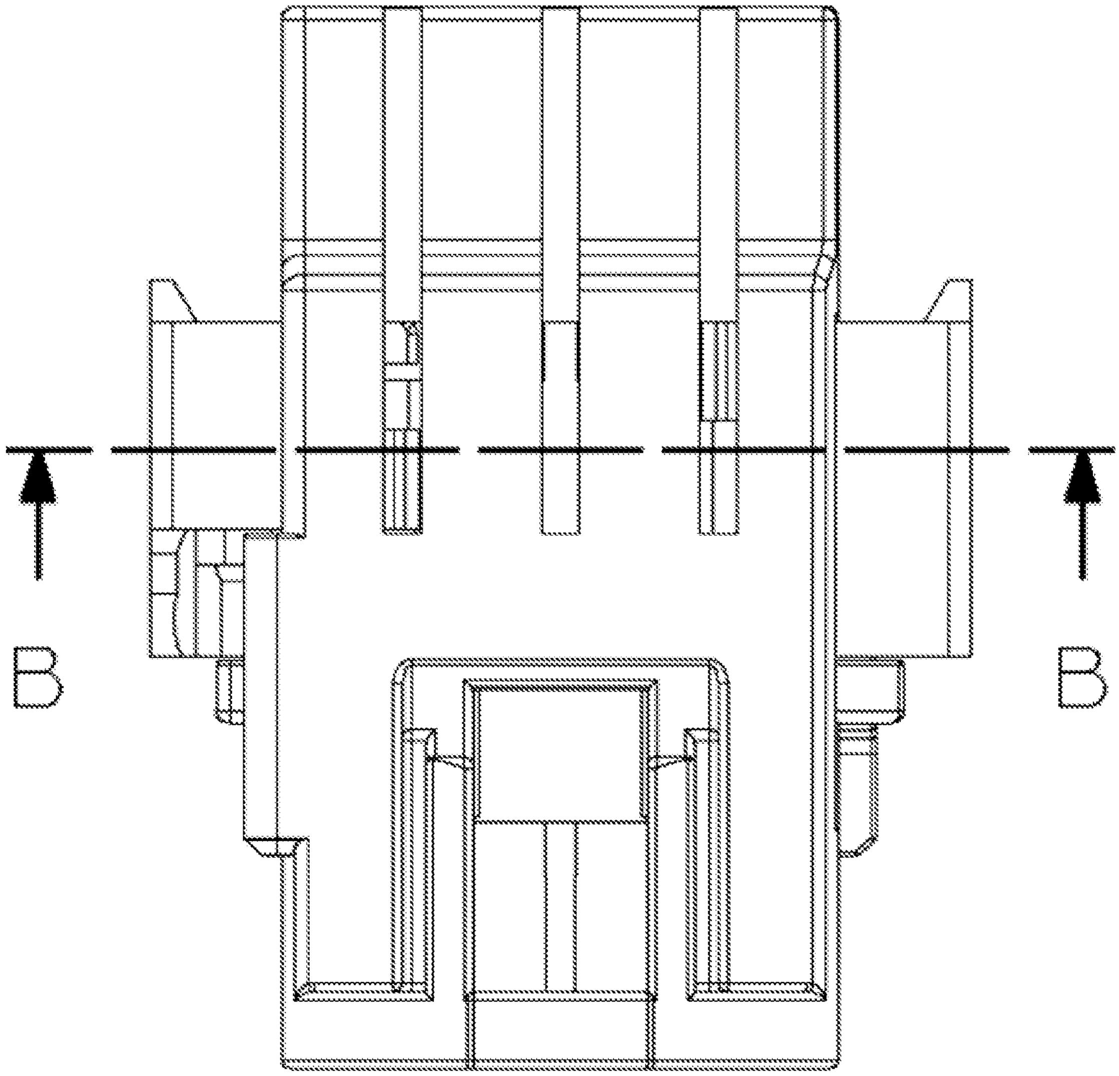
FIGS. 6A and 6B illustrate cross-sectional views along line B-B of the connector assembly in the pre-installed state.
Figure 6B:
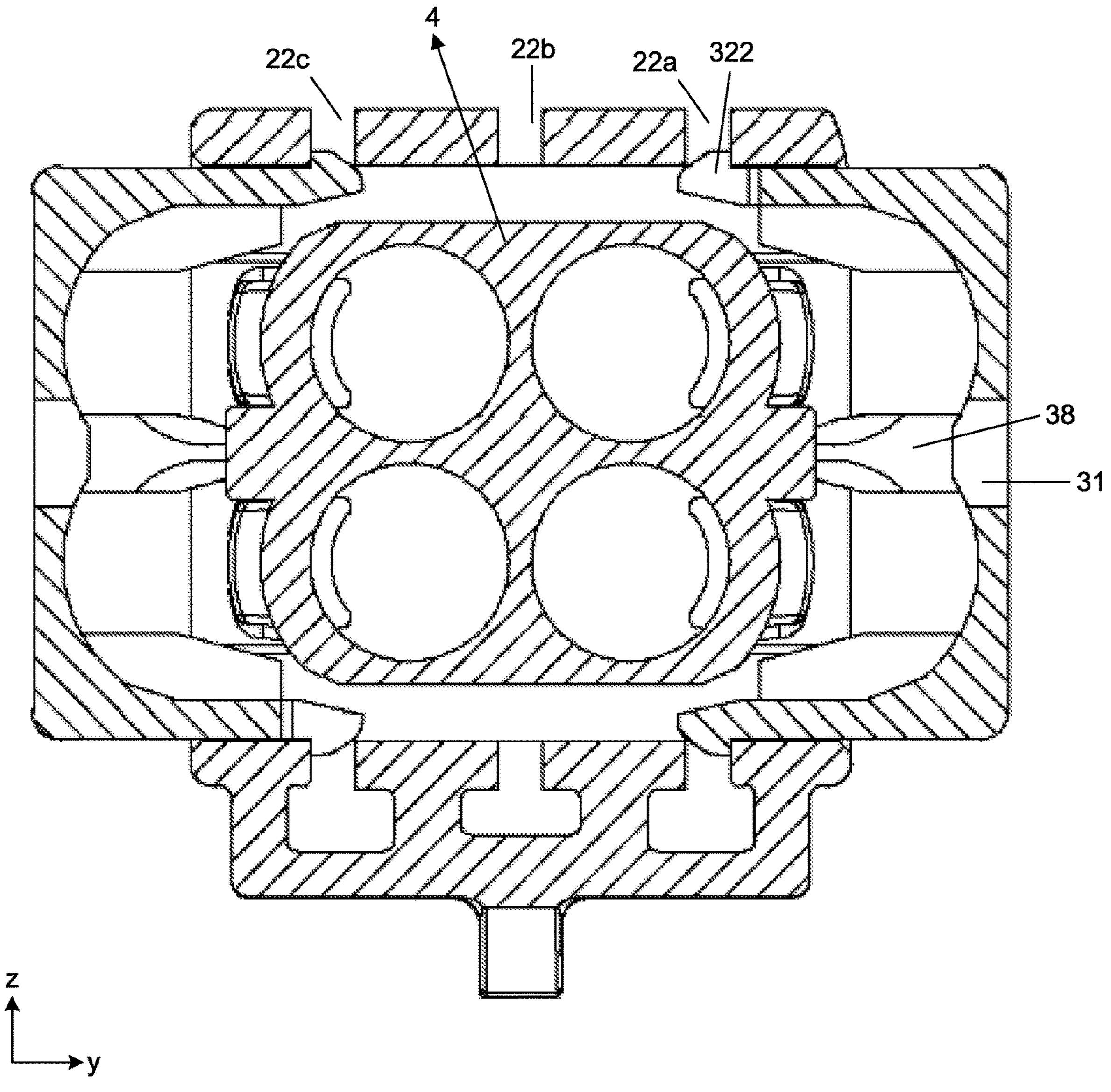

FIGS. 6A and 6B are a cross-sectional views of the connector assembly 1 shown in FIG. 1 along line B-B, showing a pre-installed state. As shown in FIG. 6B, the TPA device 3 further includes a terminal locking portion 38 extending substantially perpendicular to the main board 31 from the inner side of the main board 31. In the pre-installed state, the terminal locking portion 38 is located outside the passage in the hollow portion 21 into which the male terminal enters, thereby allowing the male terminal to be inserted into the hollow portion 21 of the first connector 2. There is a recess on both sides of the male terminal, which is used for engaging with the terminal locking portion 38 of the TPA device 3 in a fully installed state, so that the male terminal cannot be pulled out, thereby ensuring the electrical connection between the male terminal and the female connector 4 inserted subsequently. If the male terminal is not fully extended into the hollow portion 21, the terminal locking portion 38 of the TPA device 3 will be blocked as it cannot enter into the recess on both sides of the male terminal. In this situation, the TPA device 3 cannot be further pushed inward and the female connector on the other side will be blocked by the stopper 35. As a result, the electrical connection with the male terminal cannot be formed. Only when the male terminal is pushed into the correct position can the TPA device 3 be pushed to the end, and then the female connector 4 can be pushed to the end to complete the electrical connection, thereby realizing the error-proof function of the TPA device 3.

According to the embodiment, the TPA device 3 can form a pre-installed positional relationship and a fully installed positional relationship with the first connector 2 to realize the electrical disconnection and the electrical connection between the male terminal in the first connector and the female terminal in mating connector. The TPA device is not required to be completely detached from the first connector 2, and can adopt a rigid design, avoiding the risk of failure due to material yielding. In addition, it will be less possible for the TPA device to be deformed during actual use, so the TPA device can be used repeatedly.

In the above, the embodiment of the invention is described by taking the male connector as an example. It should be appreciated that the present invention is not limited by the type of terminal mounted in the connector. Therefore, the present invention is not limited to the TPA device of the male connector, and a similar structure can also be applied to the TPA device of the female connector.

The preferred embodiments of the present invention have been described above in detail. However, it should be understood that various embodiments and modifications may be employed in the present invention without departing from its broad spirit and scope. Those skilled in the art can make many modifications and changes according to the concept of the present invention without creative work. Therefore, all those technical schemes that the skilled in the art can obtain through logical analysis, reasoning, or limited experiment on the basis of prior art according to conception of the present invention should be within the protection range determined by the claims of the present invention.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A terminal position assurance (TPA) device, comprising:

a main body including a main board, an upper board, and a lower board, wherein the upper board and the lower board are perpendicular to the main board and are located on the same side of the main board, and the upper board and the lower board have distal ends away from the main board;

an extension arm extending from the distal end of the upper board in a direction substantially perpendicular to the main board;

a stopper extending from an outer edge of the extension arm and thus going beyond the main body; and at least one of an upper engaging portion and a lower engaging portion, wherein the upper engaging portion is located at the distal end of the upper board, and the lower engaging portion is located at the distal end of the lower board, wherein the extension arm is located adjacent to one side of the main body, wherein the stopper is located at a distal end of the extension arm and extends in a direction perpendicular to the extension arm and parallel to a plane of the upper board, and wherein the upper engaging portion is located adjacent to another side of the main body, and the upper engaging portion, the lower engaging portion and the stopper do not overlap with each other in an extension direction of the stopper.

2. The terminal position assurance device in accordance with claim 1, wherein the upper engaging portion and the lower engaging portion are elongated, protruding from outer surfaces of the upper board and the lower board respectively, and wherein their length directions are parallel to the extension direction of the stopper.

3. The terminal position assurance device in accordance with claim 1, wherein a TPA device limiting portion is formed on the main board, wherein the TPA device limiting portion is selected from a group consisting of a hole, a depression or a protrusion.

4. The terminal position assurance device in accordance with claim 1, wherein the main board comprises a detaching part, the detaching part is a bump extending from an edge of the main board.

5. The terminal position assurance device in accordance with claim 1, wherein the main body further includes a terminal locking portion extending perpendicular to the main board from an inner side of the main board.

6. The terminal position assurance device in accordance with claim 1, wherein the terminal position assurance device employs a rigid structure.

7. A connector assembly, comprising:

a first connector comprising a connector housing, the connector housing having a hollow portion in communication with openings at both ends, the hollow portion defining a passage for insertion of a mating connector; and a terminal position assurance (TPA) device, the terminal position assurance device is to be mounted onto the connector housing and is to be switched between a pre-installed state and a fully installed state, wherein the terminal position assurance device comprises: a main body including a main board, an upper board and a lower board, wherein the upper board and the lower board are perpendicular to the main board and are located on the same side of the main board, and the upper board and the lower board have distal ends away from the main board, an extension arm extending from the distal end of the upper board in a direction substantially perpendicular to the main board, and a stopper extending from an outer edge of the extension arm and thus going beyond the main body, wherein, the stopper of the terminal position assurance device is in the passage of the connector housing for entrance of the mating connector when the terminal position assurance device is in pre-installed state and the stopper of the terminal position assurance device is outside the passage of the connector housing for entrance of the mating connector when the terminal position assurance device is in fully installed state.

8. The connector assembly in accordance with claim 7, wherein a plurality of positioning grooves is arranged in parallel on an inner side of at least one of an upper portion and a lower portion of the connector housing, wherein the positioning grooves extend to an end edge along an insertion direction of the mating connector, wherein opening communicated with the hollow portion of the housing is provided on at least one of both sides of the housing, and wherein the opening is configured for insertion of the terminal position assurance device.

9. The connector assembly in accordance with claim 8, having two of the terminal position assurance device, having two of the opening, and wherein the plurality of positioning grooves includes three positioning grooves.

10. The connector assembly in accordance with claim 8, wherein the positioning grooves penetrate the upper or lower portions of the housing where they are located, thereby forming slits.

11. The connector assembly in accordance with claim 8, wherein the connector housing further comprising a housing limiting portion positioned in the opening and adjacent to the opening and wherein the housing limiting portion is to be mated with TPA device limiting portion on the TPA.

12. The connector assembly in accordance with claim 8, wherein in the pre-installed state, an upper engaging portion and/or a lower engaging portion of the terminal position assurance device are respectively engaged with one of the three positioning grooves of a corresponding one of the upper and lower portions of the connector housing of the first connector that is closest to the main board of the terminal position assurance device, the stopper of the terminal position assurance device partially blocks a passage in the hollow portion into which the mating connector enters and wherein in the fully installed state, the upper engaging portion and/or the lower engaging portion of the terminal position assurance device are respectively engaged with a middle one of the three positioning grooves of a corresponding one of the upper and lower portions of the connector housing of the first connector, the stopper further extends into the hollow portion and is positioned outside the passage in the hollow portion into which a female connector enters.

13. The connector assembly in accordance with claim 8, wherein the TPA comprise a first terminal position assurance device and a second terminal position assurance device, wherein the first and second terminal position assurance devices each includes both of an upper engaging portion and a lower engaging portion, wherein in the pre-installed state, the upper engaging portion of the first terminal position assurance device is engaged with one of the three positioning grooves of the upper portion of the housing of the first connector that is closest to the main board of the terminal position assurance device, and the upper engaging portion of the second terminal position assurance device is engaged with one of the three positioning grooves of the lower portion of the connector housing of the first connector that is closest to the main board of the terminal position assurance device, and wherein in the fully installed state, the upper engaging portion of the first terminal position assurance device is engaged with a middle one of the three positioning grooves of the upper portion of the housing of the first connector, and the upper engaging portion of the second terminal position assurance device is engaged with a middle one of the three positioning grooves of the lower portion of the connector housing of the first connector.

* * * * *